United States Patent [19]

Wilgus et al.

[11] 4,175,044
[45] Nov. 20, 1979

[54] MANNICH BASE COMPOSITION AND LUBRICATING OIL COMPOSITIONS CONTAINING SAME

[75] Inventors: Donovan R. Wilgus, Richmond; John M. King, San Rafael, both of Calif.

[73] Assignee: Chevron Research Company, San Francisco, Calif.

[21] Appl. No.: 838,196

[22] Filed: Sep. 30, 1977

Related U.S. Application Data

[63] Continuation-in-part of Ser. No. 756,568, Jan. 3, 1977, abandoned.

[51] Int. Cl.² ............................................. C10M 1/54
[52] U.S. Cl. .................................. 252/42.7; 252/47.5; 252/51.5 R; 260/570.5 P
[58] Field of Search ............... 252/42.7, 47.5, 51.5 R; 260/570.5 P

[56] References Cited

U.S. PATENT DOCUMENTS

| | | | |
|---|---|---|---|
| 3,368,972 | 2/1968 | Otto | 252/47.5 |
| 3,586,629 | 6/1971 | Otto et al. | 252/42.7 |
| 3,736,357 | 5/1973 | Piasek et al. | 260/570.5 P |
| 3,741,896 | 6/1973 | Abbott et al. | 252/42.7 |
| 3,809,648 | 5/1974 | Hotten | 252/42.7 X |

Primary Examiner—Delbert E. Gantz
Assistant Examiner—Andrew Metz

Attorney, Agent, or Firm—D. A. Newell; L. L. Vaughan

[57] ABSTRACT

New Mannich bases and the alkaline earth metal salts thereof are prepared by condensing formaldehyde and a polyamine with a sulfur-containing phenolic mixture consisting of (1) from 5 to 40% of a sulfurized alkylphenol of the formula

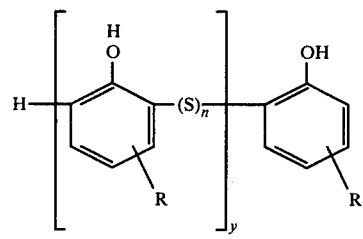

wherein R is $C_8$–$C_{36}$ alkyl, n is an integer from 1 to 8, and y is an integer from 1 to 9, and (2) from 95 to 60% of a phenolic mixture consisting of (a) from 95 to 30% phenol alkylated with a propylene tetramer and (b) from 5 to 70% phenol alkylated with a straight-chain alpha-olefin of from 16 to about 28 carbon atoms or alpha-olefin mixtures wherein the alpha-olefins are of from 16 to about 28 carbon atoms. They are useful as additives for lubricating oils, particularly for use in marine cylinder lubricating oils.

10 Claims, No Drawings

MANNICH BASE COMPOSITION AND LUBRICATING OIL COMPOSITIONS CONTAINING SAME

CROSS-REFERENCE TO RELATED APPLICATION

This application is a continuation-in-part of application Ser. No. 756,568, filed Jan. 3, 1977 now abandoned, the disclosure at which is incorporated herein by reference.

BACKGROUND OF THE INVENTION

This invention relates to novel Mannich bases and their uses as lubricating oil additives.

For a variety of reasons, higher sulfur content fuels are now being used, particularly in marine engines. This high sulfur content leads to the formation in the presence of oxygen of corrosive sulfur acids, particularly sulfuric acid. To prevent damage to the engine from these sulfur acids, they must be neutralized with a basic material. This basic material is ordinarily an additive in the oil used to lubricate the engine. As higher sulfur content fuels are used, a greater and greater reservoir of alkalinity must be included in the lubricating oil to neutralize the acids. However, using conventional additives, such as calcium phenates, an increase in the amount of additive leads to an increase in ash formation, which is detrimental to the engine.

It is an object of this invention to provide a lubricating additive which is effective in neutralizing sulfur acids. It is a further object of this invention to provide a lubricating oil additive which is also an effective dispersant. It is an additional object of this invention to provide an additive which can neutralize large quantities of these acids with lower resultant ash formation than for conventional additives.

DESCRIPTION OF THE PRIOR ART

U.S. Pat. No. 3,036,003 teaches the use in lubricating oils of a combination of a detergent amount of a basic alkaline earth metal petroleum sulfonate and the condensation product of an alkyl-substituted phenol in which the alkyl group contains from 4 to 20 carbon atoms, formaldehyde and an alkylene polyamine and the alkaline earth metal salts thereof. The molar ratio of the reactants of this condensation product are 0.5–2 mols of each of the phenol and formaldehyde for each nitrogen atom present in the polyamine.

U.S. Pat. No. 3,649,229 teaches the use of high molecular weight Mannich reaction products as additives for hydrocarbon fuels. The condensation product is prepared by reacting a high molecular weight alkylhydroxyaromatic compound having a molecular weight of from about 600 to 3000 with an amine and an aldehyde. The molar ratio of the reactants is 1:0.1–10 to 0.1–10. A specific example teaches the preparation of a Mannich condensation product from polypropylphenol of 900 molecular weight with diethylene triamine and paraformaldehyde in the ratio 1:0.75–1.

U.S. Pat. No. 3,741,896 teaches the use as lubricating oil additives of compositions prepared by reacting a sulfurized alkylphenol and a Mannich base in the presence of an alkaline earth metal base and a liquid hydroxylic compound.

SUMMARY OF THE INVENTION

The Mannich bases and the alkaline earth metal salts thereof of this invention are prepared from formaldehyde, a polyamine and a sulfur-containing phenolic mixture consisting of (1) from 5 to 40% of a sulfurized alkylphenol of the formula

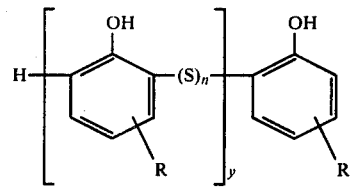

wherein R is $C_8$–$C_{36}$ alkyl, n is an integer from 1 to 8, and y is an integer from 1 to 9, and (2) from 95 to 60% of a phenolic mixture consisting of (a) from 95 to 30% phenol alkylated with a propylene tetramer and (b) from 5 to 70% phenol alkylated with a straight-chain alpha-olefin of from 16 to about 28 carbon atoms or alpha-olefin mixtures wherein the olefins contain of from 16 to about 28 carbon atoms. These Mannich bases and their salts are useful as lubricating oil additives.

DETAILED DESCRIPTION OF THE INVENTION

Component 1 of the sulfur-containing phenolic mixture is a sulfurized alkylphenol. These materials are well known for use in lubricating oils. They usually contain from 4–20 weight percent sulfur and usually 8–18 weight percent sulfur. For the most part, they have the formula

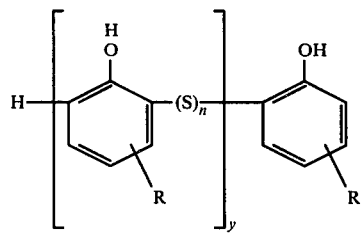

wherein R is $C_8$–$C_{36}$ alkyl, n is an integer from 1 to 8, and y is an integer from 1 to 9. Various methods for preparing these sulfurized alkylphenols are disclosed in U.S. Pat. No. 3,741,896.

Component 2a of the sulfur-containing phenolic mixture is prepared by alkylating phenol with propylene tetramer. It is also known in the art as tetrapropenyl phenol or dodecylphenol.

Component 2b of the sulfur-containing phenolic mixture can be a phenol alkylated with a straight-chain alpha-olefin of from 16 to about 28 carbon atoms, or a phenol which has been alkylated with a mixture of alpha-olefins of from 16 to about 28 carbon atoms in each olefin. It is important for the effectiveness of the additive that at least one olefin alkylating group contains at least 16 carbon atoms. Thus, a phenol alkylated with, for example, two groups containing 9 carbon atoms each would not, when used to prepare additives of this invention, provide adequate performance, especially from the standpoint of forming a product with a viscosity suitable for use in commercial operations.

Mixtures of alpha-olefins, available on a commercial basis, are suitable for alkylation of the phenols of the invention. These mixtures normally contain predominantly $C_{20}$ to $C_{26}$ olefins but may also contain a small proportion of olefins having less than 16 or more than 28 carbon atoms. A representative olefin mixture is Dailen 208, manufactured by Mitubishi.

Preferred olefins are those which are a mixture of about 60-80 mol percent $C_{18}$-$C_{28}$ alpha-olefins and about 40 to 20 mol percent $C_{24}$-$C_{28}$ alpha-olefins.

The percent of each phenolic compound from group 1 and group 2a and 2b used in the phenolic mixture is based on the phenol equivalents (calculated from the measured hydroxyl number) of each.

Formaldehyde, or a formaldehyde precursor, such as paraformaldehyde, is used to prepare the condensation product of this invention.

The polyamines used in preparing the novel compositions of this invention are the well-known ethylene amines, specifically ethylene diamine, diethylene triamine, triethylene tetraamine, tetraethylene pentamine, and pentaethylene hexamine. These compounds are usually prepared by the reaction of an alkylene chloride with ammonia. This reaction yields a somewhat complex mixture of alkylene amines, including some cyclic condensation product. These mixtures are also included within the scope of the term "polyamine".

Also included within the scope of the term "polyamine" are those amines prepared by reaction of acrylonitrile with an ethylene amine as described above, or with an amine of the formula $H_2N$—$(CH_2)_x NH_2$ where x is 3-6, followed by reduction of the resultant intermediate. For example, the product prepared from ethylene diamine and acrylonitrile would be $H_2N$—$(CH_2)_3 NH$—$(CH_2)_2 NH$—$(CH_2)_3 NH_2$. Preferred polyamine, for use in this invention, is diethylene triamine.

The Mannich bases of this invention can be prepared by conventional methods as described in the art. It is preferred to prepare the Mannich bases by reacting 1 mol of the sulfur-containing phenolic mixture with 0.5-0.85 mol formaldehyde and at least 0.3 mol of polyamine. The reaction is carried out at a temperature of 25°-140° C., preferably 25°-130° C., and in the presence of a suitable solvent, such as benzene or toluene, which can be recovered from the reaction product. If desired, the reaction may be carried out in a mineral lubricating oil and the condensation product is recovered as a lubricating oil concentrate.

Alkaline earth metal salts of the Mannich bases of this invention are particularly useful as lubricating oil additives. Preferred alkaline earth metal salts are calcium and magnesium.

The alkaline earth metal salts of the Mannich bases are prepared using conventional methods, for example, by treating the Mannich base with an alkaline earth metal hydroxide, such as calcium hydroxide or magnesium methoxide, in the presence of a promoter, such as water, ethylene glycol, 1,3-propane diol, 1,4-butane diol, diethylene glycol, butyl cellosolve, propylene glycol, 1,3-butylene glycol, methylcarbitol, diethanol amine, N-methyldiethanol amine, dimethyl formamide, N-methyl acetamide, or dimethyl acetamide. Preferred promoters are water, ethylene glycol and dimethyl acetamide. Most preferred is ethylene glycol. The reaction is carried out at 100°-175°-202° C. After the reaction is completed, the product is stripped at a higher temperature, such as 175°-202° C. and at reduced pressure, for example, 20 mm Hg, to remove any unreacted low-molecular-weight polyamines, such as ethylene diamine and diethylene triamine, and other volatile components.

The Mannich bases and the alkaline earth metal salts thereof of this invention provide a high alkalinity value. The alkaline earth metal salts provide a particularly high alkalinity value at a lower ash content than is present in conventional dispersants and acid neutralizers used in lubricating oil additives.

Alkalinity value is one method of specifying the degree of overbasing of the phenate portion of Mannich base. It is also a measure of the acid-neutralizing properties of the compound. The method for determining the alkalinity value of a composition is set forth in ASTM Method D-2896. Briefly, the alkalinity value is the total base number given as milligrams of potassium hydroxide per gram of sample. It is the quantity of perchloric acid expressed in terms of equivalent number of milligrams of potassium hydroxide that is required to neutralize all basic constituents present in one gram of sample. For example, if a composition has the same acid-neutralizing capacity per gram as 10 mg of potassium hydroxide, the composition is given an alkalinity value of 10. The lower limit of alkalinity value is 0 for a neutral phenate. Values of 200-260 are especially desirable for use in lubricants which are exposed to the decomposition products of sulfur-containing diesel fuels. Further, the high alkalinity value is achieved with a lower amount of ash from the calcium salt for the products of this invention than would be present if conventional metal phenate additives were used.

Most importantly, the Mannich bases of this invention have a sufficiently low viscosity to enable their preparation using conventional processing equipment, the products have a viscosity of from about 1000 to 3000 Saybolt Universal Seconds (SUS) at 99° C.

The lubricant composition is prepared by admixing through conventional admixing techniques the appropriate amount of the Mannich base or the alkaline earth metal salt of the Mannich base with a lubricating oil. The selection of the particular base oil depends on the contemplated application of the lubricant and the presence of other additives. Generally, the amount of the Mannich base or the alkaline earth metal salt thereof used in the lubricating oil will vary from 0.1 to 40% by weight, and preferably from 3 to 35% by weight.

The lubricating oil which may be used in this invention includes a wide variety of hydrocarbon oils, such as naphthenic bases, paraffin bases and mixed base oils. The lubricating oils may be used individually or in combination and generally have a viscosity which ranges from 50 to 5000 SUS and usually from 100 to 1500 SUS at 38° C.

In many instances, it may be advantageous to form concentrates of the Mannich base or the alkaline earth metal salts thereof of this invention within a carrier liquid. These concentrates provide a convenient method of handling and transporting the additives of this invention before their subsequent dilution and use. The concentration of the Mannich base or the alkaline earth metal salt of the Mannich base within the concentrates may vary from 85 to 40% by weight, although it is preferred to maintain the concentration between about 50 and 70% by weight.

As desired, other additives may be included in the lubricating oil compositions of this invention. These additives include antioxidants or oxidation inhibitors, dispersants, rust inhibitors, anticorrosive agents, and so forth. Of particular interest are overbased sulfonates. Other types of lubricating oil additives which may be employed include antifoam agents, stabilizers, antistain agents, tackiness agents, antichatter agents, dropping point improvers, antisquawk agents, extreme pressure agents, odor control agents, and the like.

EXAMPLES

Example A

Into a reaction vessel are introduced 18,100 parts of phenol alkylated with propylene tetramer, 750 parts of calcium oxide and 4620 parts of sulfur, the temperature of the mixture being maintained at 220° F. (104° C.). The temperature is then raised to 265°–275° F. (130°–136° C.) and 580 parts of ethylene glycol is charged. Hydrogen sulfide begins to evolve and a low-rate nitrogen purge is begun over the top of the reactor. The temperature is slowly raised to 335°–340° F. (169°–171° C.) and the temperature maintained for a period of 6 hours. The mixture is then cooled and the product isolated.

The following examples are presented to illustrate the practice of specific embodiments of this invention and should not be interpreted as limitations on the scope of the invention.

Example 1

To a 3-liter flask is added 150 g diluent oil, 278 g (0.6 mol) phenol alkylated with a mixture of 70% alpha-olefins of 18 to 28 carbon atoms and 30% alpha-olefins of 24 to 28 carbon atoms, 493 g (1.8 mol) of phenol alkylated with propylene tetramer and 249 g (0.6 phenol equivalents calculated from alkylphenol charged in the preparation as illustrated in Example A) of sulfurized alkylphenol prepared by the method of Example A. The mixture is stirred for 5 minutes, and then 155 g (1.5 mols) diethylene triamine is added. After stirring for 5 minutes, 70.5 g paraformaldehyde (2.25 mols formaldehyde) is added. The mixture is heated to 130° C. over a period of 1 hour and held at 125°–130° C. for an additional hour. 186 g (3 mols) ethylene glycol is added. After stirring the mixture at 112° C. for 10 minutes, 111 g (1.5 mols) calcium hydroxide is added. The reaction mixture is heated to 175° C. over a period of 1 hour and held for an additional hour at 175°–178° C. The mixture is stripped to 202° C. bottoms at 20 mm Hg to yield 1338 g of crude product. 245 g diluent oil is added and the mixture filtered through diatomacecus earth to yield a product having an alkalinity value of 225. The product contains 3.96% calcium, 2.83% nitrogen and 1.02% sulfur and has a viscosity of 1565 SUS at 210° F.

Example 2

To a 3-liter flask is added 150 g diluent oil, 278 g (0.6 mol) of phenol alkylated with a mixture of 70% alpha-olefins of 18 to 28 carbon atoms and 30% alpha-olefins of 24 to 28 carbon atoms, 509 g (1.8 mol) of phenol alkylated with propylene tetramer and 249 g (0.6 phenol equivalents calculated from alkylphenol charged in the preparation as illustrated in Example A) of sulfurized alkylphenol prepared according to the procedure of Example A. After mixing there are added 155 g (1.5 mols) diethylene triamine and then 70.5 g paraformaldehyde (2.25 mols formaldehyde). The mixture is heated to 130° C. over a period of 1 hour and held for 1 hour at 125°–130° C. 186 g (3 mols) ethylene glycol is added with stirring for 10 minutes at 112° C. and then 111 g (1.5 mols) calcium hydroxide is added. The reaction mixture is heated to 175° C. for 1 hour and held at 175°–178° C. for an additional hour. The mixture is stripped to 175° C. bottoms at 20 mm Hg to yield 1380 g crude product. 260 g diluent oil is added and the mixture filtered through diatomaceous earth to yield a product having an alkalinity value of 224 and containing 3.83% calcium, 3.22% nitrogen and 1.07% sulfur. The product has a viscosity of 1373 SUS at 210° F.

Example 3

To a 3-liter flask is added 150 g diluent oil, 547 g (1.2 mols) phenol alkylated with a mixture of 70% alpha-olefins of 18 to 28 carbon atoms and 30% alpha-olefins of 24 to 28 carbon atoms, 329 g (1.2 mols) of phenol alkylated with propylene tetramer, and 255 g (0.6 phenol equivalents calculated from alkylphenol charged in the preparation as illustrated in Example A) of sulfurized alkylphenol prepared by the method of Example A. The mixture is heated to 80° C. and 155 g (1.5 mols) diethylene triamine and 71 g paraformaldehyde (2.25 mols formaldehyde) are added. The mixture is heated to 125° C. over a period of 1 hour and held at 125°–130° C. for an additional hour. After cooling the reaction mixture to 110° C., 186 g (3 mols) ethylene glycol and 111 g (1.5 mols) calcium hydroxide are added. The reaction mixture is heated to 175° C. over a period of 1 hour and held for an additional hour at 175°–177° C. The mixture is stripped to 202° C. bottoms at 20 mm Hg to yield 1470 g crude product. Diluent oil (113 g) is added and the mixture is filtered through diatomaceous earth to yield a product having an alkalinity value of 240. The product contains 3.91% calcium, 3.04% nitrogen, and 1.17% sulfur and has a viscosity of 1638 SUS at 210° F.

Example 4

To a 3-liter flask is added 150 g diluent oil, 274 g (0.6 mol) phenol alkylated with a mixture of 70% alpha-olefins of 18 to 28 carbon atoms and 30% alpha-olefins of 24 to 28 carbon atoms, 493 g (1.8 mols) phenol alkylated with propylene tetramer, and 255 g (0.6 phenol equivalents calculated from alkylphenol charged in the preparation as illustrated in Example A) of sulfurized alkylphenol prepared by the method of Example A. The mixture is heated to 80° C. and 155 g (1.5 mols) diethylene triamine and 71 g paraformaldehyde (2.25 mols formaldehyde) are added. The mixture is heated to 130° C. over a period of 1 hour and held at this temperature for an additional hour. Ethylene glycol (93 g, 1.5 mols) and calcium hydroxide (89 g, 1.2 mols) are added at 110° C. The mixture is heated to 175° C. over a period of 1 hour and held at 175°–180° C. for an additional hour. The mixture is stipped to 202° C. at 20 mm Hg to yield 1311 g crude product. Diluent oil (140 g) is added and the mixture filtered through diatomaceous earth to yield a product having an alkalinity value of 210. The product contains 3.45% calcium, 2.95% nitrogen and 1.2% sulfur and has a viscosity of 2919 SUS at 210° F.

Example 5

To a 3-liter flask is added 150 g diluent oil, 274 g (0.6 mol) phenol alkylated with a mixture of 70% alpha-olefins of 18 to 28 carbon atoms and 30% alpha-olefins of 24 to 28 carbon atoms, 510 g (1.8 mols) phenol alkylated with propylene tetramer and 255 g (0.6 phenol equivalents calculated from alkylphenol charged in the preparation as illustrated in Example A) of sulfurized alkylphenol prepared by the method of Example A. At 80°

C., there is added 155 g (1.5 mols) ethylene glycol and 71 g paraformaldehyde (2.25 mols formaldehyde). The mixture is heated to 125° C. over a period of 1 hour and held at 125°–130° C. for an additional hour. Ethylene glycol (93 g, 1.5 mols) and calcium hydroxide (66.7 g, 0.9 mols) is added at 110° C. The reaction mixture is heated to 175° C. over a period of 1 hour and held at 175°–178° C. for an additional hour. The mixture is stripped to 202° C. bottoms at 20 mm Hg to yield 1303 g crude product. Diluent oil (140 g) is added and the mixture filtered through diatomaceous earth to yield a product having an alkalinity value of 180. The product contains 2.94% calcium, 1.14% nitrogen, 1.14% sulfur and has a viscosity of 1741 SUS at 210° F.

Example 6

The compounds of this invention are tested in lubricating oil compositions in the well-known 1-G Caterpillar test. In this test, a single-cylinder diesel engine having a 5⅛" bore by 6½" stroke is operated under the following conditions: timing, °BTDC 8; brake mean effective pressure psi, 141; brake horsepower, 42; BTU's per minute, 5850; speed 1800 rpm; air boost 53" Hg absolute; air temperature in, 255° F. (124° C.); water out, 190° F. (88° C.); and sulfur in fuel, 0.4% by weight. At the end of each 12 hours of operation, sufficient oil is drained from the crankcase to allow addition of 1 quart of oil. In the test of the lubricating oil compositions of this invention, the 1-G test is run for 60 hours. At the end of this period, the engine is dismantled and rated for cleanliness. The ring lands are rated on a scale of 0 to 800, with 0 representing clean and 800 representing black deposits. The ring grooves are rated on a scale of 0 to 100% groove fill, with 0 representing clean. The underhead of the piston is rated on a scale of 0 to 10, with 0 representing dirty and 10 representing clean.

The base oil used in these tests is a Midcontinent base stock SAE 30 oil containing the noted millimols of calcium from the product being tested, as shown in Table I. The results of the testing of these lubricating oils are set forth in Table I.

TABLE I

| | | Caterpillar 1-G Test | | |
|---|---|---|---|---|
| Product of Example | Mmols per kg | Grooves | Lands | Under head |
| 1 | 45 | 28-6.0-1.5-0.8 | 480-50-55 | 8.2 |
| 2 | 43 | 45-14.1-1.8-1.1 | 470-125-55 | 8.0 |
| 3 | 41 | 44-14.1-1.8-1.0 | 640-90-125 | 8.3 |
| 4 | 41 | 41-9.2-2.0-1.1 | 660-45-80 | 8.3 |

What is claimed is:

1. A Mannich base condensation product selected from the group consisting of
   (A) The Mannich base prepared by condensing formaldehyde and a polyamine with a sulfur-containing phenolic mixture consisting of (1) from 5 to 40% of a sulfurized alkylphenol of the formula

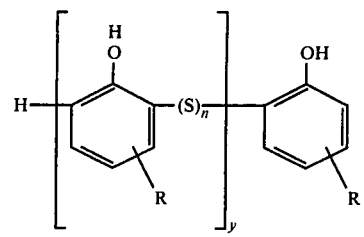

wherein R is $C_8$–$C_{36}$ alkyl, n is an integer from 1 to 8, and y is an integer from 1 to 9, and (2) from 95 to 60% of a phenolic mixture consisting of (a) from 95 to 30% phenol alkylated with a propylene tetramer, and (b) from 5 to 70% phenol alkylated with a straight-chain alpha-olefin of from 16 to about 28 carbon atoms or alpha-olefin mixtures wherein the olefins are of from 16 to about 28 carbon atoms and
   (B) the alkaline earth metal salts thereof.

2. The calcium salt of said condensation product of claim 1 wherein said olefin is a mixture of alpha olefins of 16 to about 28 carbon atoms.

3. The magnesium salt of said condensation product of claim 1 wherein said olefin is a mixture of alpha olefins of 16 to about 28 carbon atoms.

4. A lubricating oil composition comprising an oil of lubricating viscosity and from 0.1 to 40% by weight of the condensation product or an alkaline earth metal salt thereof of claim 1.

5. A lubricating oil composition comprising an oil of lubricating viscosity and from 0.1 to 40% by weight of the calcium salt of claim 2.

6. A lubricating oil composition comprising an oil of lubricating viscosity and from 0.1 to 40% by weight of the magnesium salt of claim 3.

7. A lubricating oil concentrate comprising from 15 to 60% by weight of an oil of lubricating viscosity and from 85 to 40% by weight of the condensation product or an alkaline earth metal salt thereof of claim 1.

8. A process for preparing a Mannich base condensation product or an alkaline earth metal salt thereof which comprises condensing 0.5 to 0.85 mol of formaldehyde, at least 0.3 mol of a polyamine, and 1.0 mol of a sulfur-containing phenolic mixture consisting of (1) from 5 to 40% of a sulfurized alkylphenol of the formula

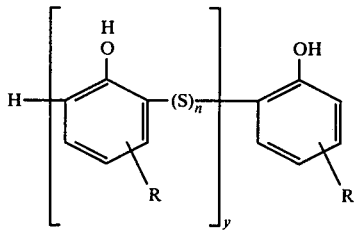

wherein R is $C_8$–$C_{36}$ alkyl, n is an integer from 1 to 8, y is an integer from 1 to 9, and (2) from 95 to 30% phenol alkylated with propylene tetramer, and (b) from 5 to 70% phenol alkylated with a straight-chain alpha-olefin of from 16 to about 28 carbon atoms or alpha-olefin mixtures wherein the olefins are of from 16 to 28 carbon atoms, and, optionally, forming the alkaline earth metal salt thereof by treating the Mannich base with an alkaline earth metal hydroxide in the presence of a promoter.

9. The product prepared according to the process of claim 8.

10. The calcium salt of the product of claim 9.